Patented Apr. 25, 1933

1,905,686

UNITED STATES PATENT OFFICE

ROBERT M. COLE, OF BRYN ATHYN, PENNSYLVANIA, ASSIGNOR TO AMERICAN DYEWOOD COMPANY, OF NEW YORK, N. Y., A CORPORATION OF PENNSYLVANIA

METHOD OF PREPARING CARBON AND PRODUCT THEREOF

No Drawing.  Application filed January 25, 1932. Serial No. 588,826.

This invention relates to carbon and to a method of treating carbon-containing material, particularly carbohydrate material, to produce carbon products.

Heretofore carbon has been produced by dry distillation of carbon-containing material usually containing natural or artificially added moisture. It is, however, difficult to control the temperature to which a mass of carbon-containing material is subjected in the usual methods, and especially to secure uniformity of temperature throughout the mass. Consequently the products of dry distillation vary in quality and character even in samples taken from the same batch. It is impracticable to produce by dry distillation carbon products of predetermined character and uniform quality.

The object of the present invention is to provide a method of treating carbonaceous materials, and especially those containing carbohydrates, to produce carbon of desired character and quality with assurance that the products will be uniform.

Another object of the invention is the provision of carbon products having desirable qualities and capable of use for a variety of purposes.

The invention depends upon the treatment of carbonaceous material while it is submerged in a suitable liquid medium at a temperature sufficient to char the material. The charring is effected in a manner which is distinguished from dry distillation in that the material remains submerged in the liquid medium throughout the operation. Neither vapors from the liquid medium nor distillation products in the form of vapor are withdrawn in any substantial quantity. The charring is carried out in a closed vessel adapted to withstand the pressure developed during the heating.

The liquid medium employed may be water. It is frequently desirable, however, in order to avoid the development of excessive pressures, to employ a suitable depressant which may be any suitable compound which is soluble in water, does not attack or is inert or neutral to the material under treatment, and sufficiently raises the boiling point of the resulting solution. Among the common materials available for that purpose, calcium chloride is most suitable. Other alkali or alkaline earth chlorides or other salts may be used, but such compounds are more expensive and therefore less desirable than calcium chloride.

The solution forming the liquid medium may be employed in various concentrations, but from 37% to 55% of calcium chloride dissolved in water affords a satisfactory medium. The amount of the depressant which is employed will, of course, depend upon the degree of modification of the boiling point which may be desired. The carbonaceous material can be subjected, while submerged in the liquid medium, to temperatures of from 300° to 350° C., with corresponding pressures of 1800 to 2800 pounds per square inch for varying periods, sufficient to effect the desired charring.

At the conclusion of the operation, the heat may be removed and the pressure may be reduced. The charred material is then withdrawn, still in suspension in the liquid medium, and may be separated by filtering or otherwise. Unless it is subjected to agitation during charring, the carbon retains the form and structure of the material treated. It may be reduced readily to a pulverulent form by crushing in a wet or dry condition. If the material is agitated during the charring operation, the resulting carbon is reduced thereby to a finely divided condition. After suitable washing, either before or after subdivision of the carbon, it is available for many technical uses and it may be subjected to further treatment, if desired, to modify its character and qualities.

The material treated may be any suitable carbonaceous material. Wood chips are especially chips which have been subjected to extraction with water or with alkaline solutions to recover soluble components are well adapted for the production of carbon. Numerous other materials, and especially those containing carbohydrates, such as sawdust, bagasse, corn stalks, straw, etc., may be used.

As an example of the invention, 16 pounds of wet logwood chips, previously extracted with water to recover logwood dye, are placed in a 5-gallon steel autoclave with 5 pounds of calcium chloride and enough water to submerge the chips, leaving sufficient space at the top of the autoclave for expansion. The autoclave is closed and the temperature is raised and maintained at about 300° C. for a few minutes, while a small amount of destructively formed gases are released. The outlet is then closed and the temperature is raised to approximately 350° C. and is maintained for 4 hours. The pressure developed within the autoclave is commensurate with the temperature and may be from approximately 2200 to 2800 pounds per square inch. When the charring is substantially complete, the pressure is released and the autoclave is cooled, after which the charge may be removed and washed to separate calcium chloride therefrom.

The yield is approximately 5 pounds of carbon having the form and structure of the original chips. It may be used in lump form or screened and sized or crushed prior to drying. While the charred chips are wet, they break down readily under slight pressure to a smooth, grease-like paste. After drying, the charred chips possess considerable mechanical strength. They may, however, be reduced to a powder in a dry condition.

The carbon product when screened can be used as a pigment for paint or printing ink in a water or oily medium. The most striking characteristic of the product is, however, its catalytic property. It functions readily as a catalyst in the conversion of halogens into halogen acids and in the conversion of methanol into formaldehyde, and in other reactions. In the reduction of halogens, the source of hydrogen from the acid is apparently the residual hydrogen which is still attached to the carbon. The capacity for bromine conversion to hydrobromic acid is upward to 800–900% of the weight of the carbon. Equivalent conversion of chlorine into hydrochloric acid can be obtained by the use of the carbon product. It is well adapted for use to remove chlorine from over-chlorinated water, and also to remove chlorophenol and odors from water. It has a certain amount of de-colorizing power or activity, but cannot be classified definitely as a de-colorizing carbon.

By a variation of the procedure, it is possible to secure carbon having strikingly different properties. Thus, if wood chips are subjected in an autoclave, while submerged in water, to a temperature of approximately 300° C., and commensurate pressure for approximately two hours to effect the major part of the charring, and then to a solution of a caustic alkali under similar conditions, the product is colloidal carbon. In carrying out the procedure, after the initial charring step the pressure is released by blowing the steam into a solution of caustic soda in an amount corresponding on a dry basis to about one-tenth of the weight of the carbon to be produced. The steam jet is so delivered into the caustic solution that when the pressure is released on the inside of the autoclave the contents of the latter are lowered in temperature to the boiling point, 100° C., which causes the automatic siphoning of the caustic solution into the autoclave. This avoids the introduction of any air during the operation. At this stage, the inlet is closed and the temperature is advanced to about 320° C., and the operation is continued at the commensurate pressure for approximately four hours. A yield of approximately 5 pounds from 16 pounds of wet wood chips containing 50% moisture is obtained.

At the conclusion of the operation, heat is removed and the presure is reduced. The coloidal carbon is suspended in the caustic soda solution and is permitted to settle therein, after which the solution is separated by decantation. The product may be washed to remove the caustic soda. In its initial condition, the carbon product cannot be filtered. It is possible, however, by the addition of a slight amount of a suitable salt such as sodium chloride to the liquor to break the colloid. The product can then be filtered and washed and may be dried or left in the form of a paste.

The coloidal carbon, before or after the coloid is broken, may be employed for various purposes, and particularly as a pigment in printing inks, paints and lacquers. It may also be added to rubber as a filler and coloring agent before vulcanization.

Carbon products produced in the manner described may be subjected to further treatment such as activation with steam, carbon dioxide, zinc salts, phosphoric acid, etc. They may also be mixed with various materials such as finely divided phosphate rock. Such a mixture, after being fired at a suitable temperature, for example about 450° C., may be used as a substitute for bone char in the de-colorizing of sugar solutions and for other purposes.

Among the advantages of the method as described are the ease and uniformity with which heat is applied to the material treated. A particular advantage is the possibility of regulating with substantial exactness the conditions of treatment in successive operations. The temperature and pressure are easily controlled, and since the temperature is necessarily uniform throughout the mass owing to the presence of the liquid in which the carbonaceous material is submerged, it is apparent that each particle of the material is subjected to precisely the same conditions. In successive operations the material can be

I claim:

1. The method of treating carbonaceous material to produce carbon which comprises subjecting such material while submerged in a liquid medium to temperature, under pressure commensurate with such temperature, sufficient to char the material, the pressure and temperature being so coordinated as to maintain the medium in which the carbonaceous material is submerged in the liquid phase during the charring of the material.

2. The method of treating carbonaceous material to produce carbon which comprises subjecting such material while submerged in water to temperature, under pressure commensurate with such temperature, sufficient to char the material, the pressure and temperature being so coordinated as to maintain the medium in which the carbonaceous material is submerged in the liquid phase during the charring of the material.

3. The method of treating carbonaceous material to produce carbon which comprises subjecting such material while submerged in a water solution of an inert compound to temperature, under pressure commensurate with such temperature, sufficient to char the material, the pressure and temperature being so coordinated as to maintain the medium in which the carbonaceous material is submerged in the liquid phase during the charring of the material.

4. The method of treating carbonaceous material to produce carbon which comprises subjecting such material while submerged in a water solution of calcium chloride to temperature, under presure commensurate with such temperature, sufficient to char the material, the pressure and temperature being so coordinated as to maintain the medium in which the carbonaceous material is submerged in the liquid phase during the charring of the material.

5. The method of treating carbonaceous material to produce carbon which comprises subjecting such material while submerged in a water solution of an inert compound to temperature, under pressure commensurate with such temperature, the pressure and temperature being so coordinated as to maintain the medium in which the carbonaceous material is submerged in the liquid phase during the charring of the material sufficient to char the material, and washing the product to remove such compound.

6. The method of treating carbonaceous material to produce carbon which comprises subjecting such material while submerged in a water solution of calcium chloride to temperature, under pressure commensurate with such temperature, the pressure and temperature being so coordinated as to maintain the medium in which the carbonaceous material is submerged in the liquid phase during the charring of the material sufficient to char the material, and washing the product to remove the calcium chloride.

7. The method of preparing carbon which comprises heating wood chips submerged in a liquid medium to temperature, under pressure commensurate with such temperature, sufficient to char the chips, the pressure and temperature being so coordinated as to maintain the medium in which the chips are submerged in the liquid phase during the charring of the chips.

8. The method of preparing carbon which comprises heating wood chips submerged in water to temperature, under pressure commensurate with such temperature, sufficient to char the chips, the pressure and temperature being so coordinated as to maintain the medium in which the chips are submerged in the liquid phase during the charring of the chips.

9. The method of preparing carbon which comprises heating wood chips submerged in a water solution of an inert compound to temperature, under pressure commensurate with such temperature, sufficient to char the chips, the pressure and temperature being so coordinated as to maintain the medium in which the chips are submerged in the liquid phase during the charring of the chips.

10. The method of preparing carbon which comprises heating wood chips submerged in a water solution of calcium chloride to temperature, under pressure commensurate with such temperature, sufficient to char the chips, the pressure and temperature being so coordinated as to maintain the medium in which the chips are submerged in the liquid phase during the charring of the chips.

11. The method of preparing carbon which comprises heating wood chips submerged in a water solution of an inert compound to temperature, under pressure commensurate with such temperature, sufficient to char the chips, the pressure and temperature being so coordinated as to maintain the medium in which the chips are submerged in the liquid phase during the charring of the chips and washing the product to remove such compound.

12. The method of preparing carbon which comprises heating wood chips submerged in a water solution of calcium chloride to temperature, under pressure commensurate with such temperature, sufficient to char the chips, the pressure and temperature being so coordinated as to maintain the medium in which the chips are submerged in the liquid phase during the charring of the chips.

13. The method of treating carbonaceous material to produce carbon which comprises initially subjecting the material while submerged in a liquid medium to temperature, under pressure commensurate with the temperature, sufficient to char the material, the pressure and temperature being so coordinated as to maintain the medium in which the carbonaceous material is submerged in the liquid phase during the charring of the material and then subjecting the material under similar temperature and pressure to the action of a water solution of caustic alkali.

14. The method of treating carbonaceous material to produce carbon which comprises initially subjecting the material while submerged in water to temperature, under pressure commensurate with the temperature, sufficient to char the material, the pressure and temperature being so coordinated as to maintain the medium in which the carbonaceous material is submerged in the liquid phase during the charring of the material and then subjecting the material under similar temperature and pressure to the action of a water solution of caustic alkali.

15. Carbon produced by the method of charring carbonaceous material set forth in claim 1.

16. Carbon produced by the method of charring wood chips set forth in claim 7.

17. Colloidal carbon produced by the method of charring carbonaceous material set forth in claim 13.

18. Colloidal carbon produced by the method of charring wood chips set forth in claim 13.

In testimony whereof I affix my signature.

ROBERT M. COLE.

CERTIFICATE OF CORRECTION.

Patent No. 1,905,686.  April 25, 1933.

ROBERT M. COLE.

It is hereby certified that error appears in the printed specification of the above numbered patent requiring correction as follows: Page 1, line 91, for "are" read "and"; page 2, lines 88 and 100, for "coloidal" read "colloidal"; and line 101, for "coloid" read "colloid"; page 3, lines 59 and 60, 71 and 72, claims 5 and 6, respectively, strike out the words "sufficient to char the material," and insert the same after "temperature," in lines 55 and 67, of said claims; and that the said Letters Patent should be read with these corrections therein that the same may conform to the record of the case in the Patent Office.

Signed and sealed this 23rd day of May, A. D. 1933.

(Seal)

M. J. Moore.
Acting Commissioner of Patents.